(12) United States Patent
Lee

(10) Patent No.: US 12,473,183 B2
(45) Date of Patent: Nov. 18, 2025

(54) LOCKING DEVICE FOR ELECTRODE TRANSFER CART, AND ELECTRODE TRANSFER CART COMPRISING SAME

(71) Applicant: LG Energy Solution, Ltd., Seoul (KR)

(72) Inventor: Jung Soo Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 451 days.

(21) Appl. No.: 17/925,519

(22) PCT Filed: Nov. 24, 2021

(86) PCT No.: PCT/KR2021/017426
§ 371 (c)(1),
(2) Date: Nov. 15, 2022

(87) PCT Pub. No.: WO2022/114785
PCT Pub. Date: Jun. 2, 2022

(65) Prior Publication Data
US 2023/0339735 A1    Oct. 26, 2023

(30) Foreign Application Priority Data
Nov. 27, 2020   (KR) .................. 10-2020-0161975

(51) Int. Cl.
*B66F 9/18* (2006.01)
*H01M 10/04* (2006.01)
*H01M 4/04* (2006.01)

(52) U.S. Cl.
CPC ........... *B66F 9/18* (2013.01); *H01M 10/0404* (2013.01); *H01M 4/04* (2013.01)

(58) Field of Classification Search
CPC ............. B66F 9/18; B66F 9/187; B66F 9/184
See application file for complete search history.

(56) References Cited

U.S. PATENT DOCUMENTS

| | | | | |
|---|---|---|---|---|
| 2,823,961 A | * | 2/1958 | Showalter | B65H 16/06 384/258 |
| 4,560,290 A | * | 12/1985 | Siebert | F16C 13/02 384/191.3 |
| 4,693,164 A | * | 9/1987 | Grinwald | F41H 11/30 89/1.13 |
| 4,822,089 A | * | 4/1989 | Moore | B60P 3/125 294/904 |
| 5,056,982 A | | 10/1991 | Stockham | |

(Continued)

FOREIGN PATENT DOCUMENTS

| | | |
|---|---|---|
| CN | 104832510 A | 8/2015 |
| CN | 108869918 A | 11/2018 |

(Continued)

OTHER PUBLICATIONS

International Search Report for PCT/KR2021/017426 mailed Mar. 3, 2022. 3 pgs.

(Continued)

*Primary Examiner* — Jonathan Snelting
(74) *Attorney, Agent, or Firm* — Lerner David LLP

(57) ABSTRACT

A lock device for an electrode transfer cart prevents detachment of a jumbo roll of an electrode substrate during transfer of the jumbo roll. An electrode transfer cart includes the lock device for the electrode transfer cart.

12 Claims, 8 Drawing Sheets

(56) References Cited

U.S. PATENT DOCUMENTS

| | | | | |
|---|---|---|---|---|
| 5,709,482 A | * | 1/1998 | Lutz | F16C 13/04 |
| | | | | 384/444 |
| 6,655,899 B1 | * | 12/2003 | Emerson | E02F 3/34 |
| | | | | 294/86.41 |
| 2019/0183246 A1 | | 6/2019 | Bernic | |

FOREIGN PATENT DOCUMENTS

| | | |
|---|---|---|
| EP | 3573205 A1 | 11/2019 |
| EP | 3556694 B1 | 8/2020 |
| JP | H06107399 A | 4/1994 |
| JP | H07252025 A | 10/1995 |
| JP | H08081193 A | 3/1996 |
| JP | 2000264507 A | 9/2000 |
| JP | 2009-084016 A | 4/2009 |
| JP | 2009126664 A | 6/2009 |
| JP | 2014-220113 A | 11/2014 |
| JP | 6318533 B2 | 5/2018 |
| KR | 880000846 Y1 | 3/1988 |
| KR | 100513247 B1 | 9/2005 |
| KR | 20100001934 U | 2/2010 |

OTHER PUBLICATIONS

Extended European Search Report for Application No. 21898611.5 dated Sep. 11, 2023. 7 pgs.

* cited by examiner

111:1111,1112,1113

LOCKING DEVICE FOR ELECTRODE TRANSFER CART, AND ELECTRODE TRANSFER CART COMPRISING SAME

CROSS-REFERENCE TO RELATED APPLICATIONS

The present application is a national phase entry under 35 U.S.C. § 371 of International Application No. PCT/KR2021/017426, filed on Nov. 24, 2021, and now published as International Publication No. WO 2022/114785 A1, which claims priority from Korean Patent Application No. 10-2020-0161975, filed on Nov. 27, 2020, all of which are hereby incorporated herein by reference in their entireties.

FIELD

The present invention relates to a lock device for an electrode transfer cart, and an electrode transfer cart including the same.

BACKGROUND

Generally, an electrode substrate for a secondary battery is stored in a form of a jumbo roll wound on a bobbin, and it includes a process of winding an electrode substrate on a bobbin, a process of transferring the jumbo roll form wound on the bobbin to a cart, and transferring the jumbo roll.

Particularly, an electrode transfer cart is used to transfer a jumbo roll of the electrode substrate.

FIG. 1 is a schematic diagram showing a conventional electrode transfer cart. Referring to FIG. 1, a conventional electrode transfer cart 10 further includes a protruding mounting arm 11 for mounting a jumbo roll, and includes a U-shaped U block 12 where a bobbin of the jumbo roll is disposed. Conventionally, the bobbin of the jumbo roll was disposed on the U block 12 and transferred. However, in the past, a safety accident sometimes occurred as the bobbin was separated from the U block 12 due to imbalance of a vertical load or horizontal load, etc. of the jumbo roll.

Hence, there is a need for a lock device for an electrode transfer cart, capable of easily transferring a jumbo roll of an electrode substrate and preventing detachment of the jumbo roll during the transfer, and an electrode transfer cart including the lock device.

SUMMARY OF THE DISCLOSURE

In order to solve the above problems of the conventional technology, the present invention provides a lock device for an electrode transfer cart, capable of easily transferring a jumbo roll of an electrode substrate and preventing detachment of the jumbo roll during the transfer, and an electrode transfer cart including the lock device.

The present invention provides a lock device for an electrode transfer cart, and an electrode transfer cart including the same. In one example, a lock device for an electrode transfer cart according to the present invention includes: a lower block having a mounting groove on which a central axis of a jumbo roll is mounted and which includes an open surface opened in one direction; an upper block covering the open surface of the lower block, in a state that the central axis of the jumbo roll has been mounted, and one side of the upper block fixed to the lower block by a hinge; and a lock handle which is formed at an opposite side of the hinge-fixed side of the upper block and includes a fixing pin which switches between a lock state and an open state by being inserted into or detached from a lock groove formed at a position corresponding to the lower block.

In a more specific example, the lower block is a U-shaped lower block having a mounting groove which is opened in an upward direction. Further, the upper block has a structure which covers an upper portion of the U-shaped lower block, in a state that the central axis of the jumbo roll has been mounted, and has one side hinge-fixed to the lower block.

For example, a lock device for an electrode transfer cart according to the present invention includes: a lower block having a mounting groove on which a central axis of a jumbo roll is mounted; an upper block covering the upper portion of the lower block, in a state that the central axis of the jumbo roll has been mounted, and the one side of the upper block is fixed to the lower block by the hinge; and a lock handle which is formed at an opposite side of the hinge-fixed sided of the upper block and includes a fixing pin which switches between a lock state and an open state by being inserted into or detached from a lock groove formed at a position corresponding to the lower block.

In one example, the lock device further includes an anti-slip pad positioned on an inner surface of the mounting groove of the lower block.

In a specific example, the mounting groove of the lower block has a groove formed by consecutive connection of a first downward slope, a horizontal plane, and second upward slope in a direction from one side to another side. At this time, a lower inner surface of the upper block has a horizontal plane.

In another example, the lock device further includes a buffer pad positioned on a lower inner surface of the upper block.

In one example, when the fixing pin is inserted into the locking groove and is pressed by an elastic body, the lock handle is in a locked state, and wherein when the fixing pin is pulled out the locking groove by pulling the fixing pin in the opposite direction to the pressing direction of the elastic body, the locking handle is in an open state.

Further, a position of a hinge, which fastens a lower block to an upper block, may be changed in at least one direction among a vertical direction, a horizontal direction, and a diagonal direction by spiral rotation. In a specific example, a diameter of the central axis of the jumbo roll is in a range of 5 to 10 inches.

Further, the present invention provides an electrode transfer cart having the above-described lock device.

In one example, the electrode transfer cart further includes a protruding mounting arm for mounting a jumbo roll, and the lock device is fastened to the mounting arm. At this time, a metal foil used for formation of an electrode current collector may be wound on a jumbo roll which is a subject of transfer.

An electrode substrate, which has a structure where an electrode mixture layer has been coated on an electrode current collector, may be wound on the jumbo roll which is the subject of transfer.

According to a lock device for an electrode transfer cart, and an electrode transfer cart including the same of the present invention, it is possible to easily transfer a jumbo roll of an electrode substrate, and prevent detachment of the jumbo roll during the transfer.

DETAILED DESCRIPTION

Figure 1:
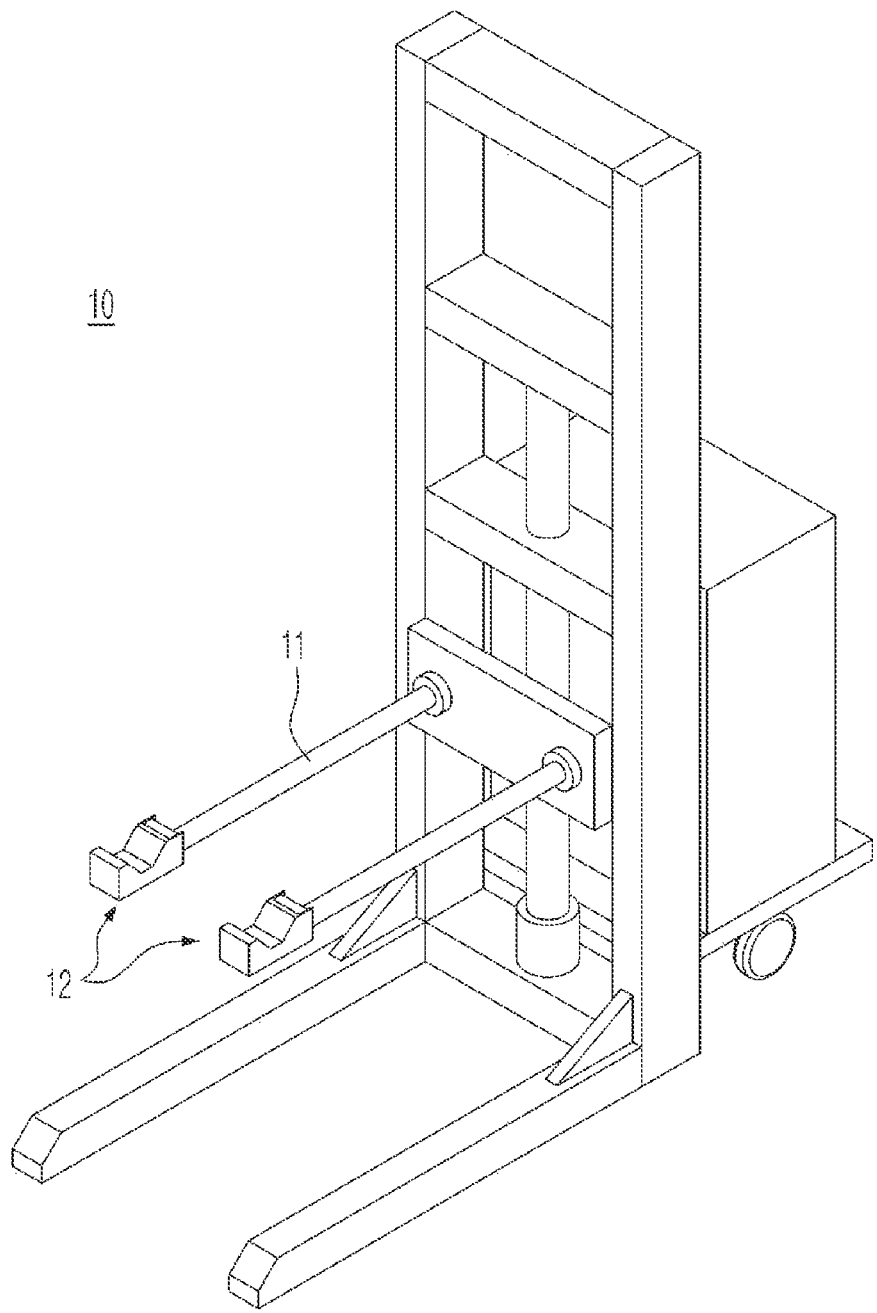
FIG. 1 is a schematic perspective view of a conventional electrode transfer cart.

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

The present invention relates to a lock device for an electrode transfer cart, and an electrode transfer cart including the same.

As described above, conventionally, in order to transfer the jumbo roll of the electrode substrate, the bobbin of the jumbo roll was disposed on the U block of the transfer cart and was then transferred. However, a safety accident sometimes occurred as the bobbin was separated from the U block due to imbalance of a vertical load or horizontal load, etc. of the jumbo roll. As such, the inventors of the present invention invented a lock device for an electrode transfer cart, capable of easily transferring a jumbo roll of an electrode substrate and preventing detachment of the jumbo roll during the transfer, and an electrode transfer cart including the lock device. Specifically, the lock device for an electrode transfer cart of the present invention can prevent detachment of the jumbo roll during the transfer by including a lower block on which the central axis of the jumbo roll is mounted, an upper block hinge-fixed to the lower block, and a lock handle which fixes the lower block and the upper block.

Hereinafter, a lock device for an electrode transfer cart, and an electrode transfer cart including the same of the present invention will be described in detail.

In one example, the present invention relates to a lock device for an electrode transfer cart, and the lock device includes: a U-shaped lower block having a mounting groove on which a central axis of a jumbo roll is mounted; an upper block covering the upper portion of the U-shaped lower block, in a state that the central axis of the jumbo roll has been mounted, and the one side of the upper block is fixed to the U-shaped lower block by a hinge; and a lock handle which is formed at an opposite side of the hinge-fixed side of the upper block and includes a fixing pin which switches between a lock state and an open state by being inserted into or detached from a lock groove formed at a position corresponding to the U-shaped lower block.

In a more specific example, the lock device for an electrode transfer cart according to the present invention includes: the lower block having a mounting groove on which a central axis of a jumbo roll is mounted; the upper block covering the upper portion of the lower block, in a state that the central axis of the jumbo roll has been mounted, and the one side of the upper block is fixed to the lower block by the hinge; and the lock handle which is formed at an opposite side of the hinge-fixed side of the upper block and includes a fixing pin which switches between a lock state and an open state by being inserted into or detached from a lock groove formed at a position corresponding to the lower block.

In one example, the lock device for an electrode transfer cart of the present invention is fastened to the mounting arm of the electrode transfer cart during the transfer of the jumbo roll of the electrode transfer cart. Particularly, the electrode transfer cart is a means for transferring the jumbo roll of an electrode substrate, and the lock device for the electrode transfer cart is fastened to the mounting arm of the electrode transfer cart and is used to prevent detachment of the jumbo roll of the electrode transfer cart. In a specific example, according to the lock device for an electrode transfer cart of the present invention, after mounting the central axis of the jumbo roll on the lower block, the upper portion of the lower block was covered with the upper block, and the fixing pin was inserted into the lock groove by using the lock handle. In this way, the lock device can be firmly fixed.

Further, as described above, the jumbo roll is a jumbo roll of an electrode substrate, and specifically has a structure where an electrode substrate, in which an electrode mixture layer has been coated on a current collector, or metal foil used for formation of an electrode current collector, is wound. In a specific example, the jumbo roll may be an electrode current collector made of copper or aluminum, etc., or may be an electrode substrate which is generated by applying a positive electrode active material or a negative electrode active material on an electrode current collector. Further, the central axis C of the jumbo roll refers to a bobbin for winding the metal foil or electrode substrate.

In one example, the mounting groove of the lower block has a groove structure formed by consecutive connection of a first downward slope, a horizontal plane, and second upward slope in a direction from one side to another side. In a specific example, the first downward slope, the horizontal plane, and the second upward slope are used to easily dispose the central axis of the jumbo roll.

In another example, the lock device further includes an anti-slip pad positioned on an inner surface of the mounting groove of the lower block. Specifically, the anti-slip pad may be made of soft synthetic resin and is preferably made of a material capable of applying frictional force to the central axis of the jumbo roll mounted on the lower block. For example, the anti-slip pad may be a nylon pad.

In a specific example, the anti-slip pad may be made of MC nylon. Further, since the molecular weight and the crystallinity the MC nylon are higher than general nylon6, the self-lubricity, wear resistance, chemical resistance, corrosion resistance, etc. are excellent. Hence, MC nylon may be suitable to the anti-slip pad. The lock device for the electrode transfer cart according to the present invention can prevent detachment of the jumbo roll mounted on the lower block by including the above-described anti-slip pad in the lower block.

In one example, the lower inner surface of the upper block has a horizontal plane. In a specific example, the lower inner surface of the upper block is a surface contacting the central axis of the jumbo roll and can prevent detachment of the jumbo roll from the lower block by pressing the central axis of the jumbo roll disposed on the lower block. Particularly, the wobble of the front surface, rear surface, upper surface and lower surface of the central axis of the jumbo roll may be prevented during the transfer of the jumbo roll by the structure of the lower block and the upper block, and the detachment, etc. of the jumbo roll may be prevented.

In another example, the lock device may further include a buffer pad positioned on a lower inner surface of the upper block. Specifically, the buffer pad is preferably made of a material capable of absorbing an impact or vibration. The buffer pad may be a rubber pad and may be a urethane pad or a polyurethane foam pad. Specifically, the urethane pad is made of flexible synthetic fiber which is resistant to moisture, acid and base and is waterproof. Particularly, by including a urethane pad on the lower inner surface of the upper block, when the transfer cart is moved, the urethane pad adsorbs the central axis of the jumbo roll to thereby remove vibration.

In further another example, an anti-slip pad is included the inner surface of the mounting groove of the lower block, and a buffer pad is included in the inner surface of the upper block. In this case, the lock device for an electrode transfer cart according to the present invention may prevent detachment of a jumbo roll, and vibration, etc. may be absorbed. As such, it is possible to more stably transfer the jumbo roll.

In one example, the lower block and the upper block are fixed to each other by hinge. In a specific example, the hinge may be installed in a region connected to the mounting arm of the transfer cart, and the lock device can be opened and closed by moving the upper block based on the axis of the hinge. At this time, a position of a hinge, which fastens a lower block to an upper block, may be changed in at least one direction among a vertical direction, a horizontal direction, and a diagonal direction by spiral rotation.

In one example, when the fixing pin is inserted into the locking groove and is pressed by an elastic body, the lock handle is in a locked state.

Further, when the fixing pin is pulled out the locking groove by pulling the fixing pin in the opposite direction to the pressing direction of the elastic body, the locking handle is in an open state. Particularly, the upper block and the lower block can be firmly fixed by inserting the fixing pin, which is connected to the upper block, to the lock groove of the lower block.

The lock handle can easily fix the upper block and the lower block in one touch manner, and an open state of the upper block from the lower block can be formed in one touch manner.

Further, the present invention provides an electrode transfer cart having the above-described lock device.

In one example, the electrode transfer cart further includes a protruding mounting arm for mounting a jumbo roll, and the lock device is fastened to the mounting arm. In a specific example, the electrode transfer cart according to the present invention further includes a protruding mounting arm for mounting a jumbo roll, and the lock device is fastened to the mounting arm. A plurality of mounting arms are provided to mount the jumbo roll from two sides, and the plurality of mounting arms protrude to be directed to each other and may protrude in a direction parallel to each other. Further, the central axis of the jumbo roll may be mounted on the lock device fastened to each of the pair of mounting arms.

In one example, the electrode transfer cart includes a handle. At this time, the handle may be formed at a side opposite to the direction in which the mounting arms protrude. Further, the electrode transfer cart may include a support which protrudes in the same direction as the direction in which the mounting arm has protruded. The support supports the electrode transfer cart 40 to be erected when the electrode transfer cart does not move.

In one example, the electrode transfer cart has a lever structure in which wheels are rotated around the rotation shaft. If the handle of the electrode transfer cart is turned downwards, the mounting arm is tilted to the front side based on the wheel axis of the wheel. Further, the user may easily transfer a jumbo roll with less force.

In one example, a metal foil used for formation of an electrode current collector is wound on a jumbo roll which is a subject of transfer. Alternatively, an electrode substrate, where an electrode mixture layer has been coated on the electrode current collector, is wound on the jumbo roll which is a subject of transfer. In a specific example, the jumbo roll may be an electrode current collector made of copper or aluminum, etc., or may be an electrode substrate which is generated by applying a positive electrode active material or a negative electrode active material on an electrode current collector. However, the present invention is not limited thereto.

Further, since the electrode transfer cart according to the present invention includes a lock device, detachment of the jumbo roll can be prevented.

DETAILED DESCRIPTION

Hereinafter, the present invention will be described in more detail with reference to drawings. In describing the drawings, similar reference numerals are used for similar elements. In the accompanying drawings, the dimensions of the structures are shown in an enlarged scale for clarity of the invention. Terms such as "first" and "second" may be used to describe various components, but the components should not be limited by the terms. The terms are used only for the purpose of distinguishing one component from another. For example, without departing from the scope of the present invention, a first component may be referred to as a second component, and similarly, the second component may also be referred to as the first component. Singular expressions include plural expressions unless the context clearly indicates otherwise.

First Embodiment

Figure 2:
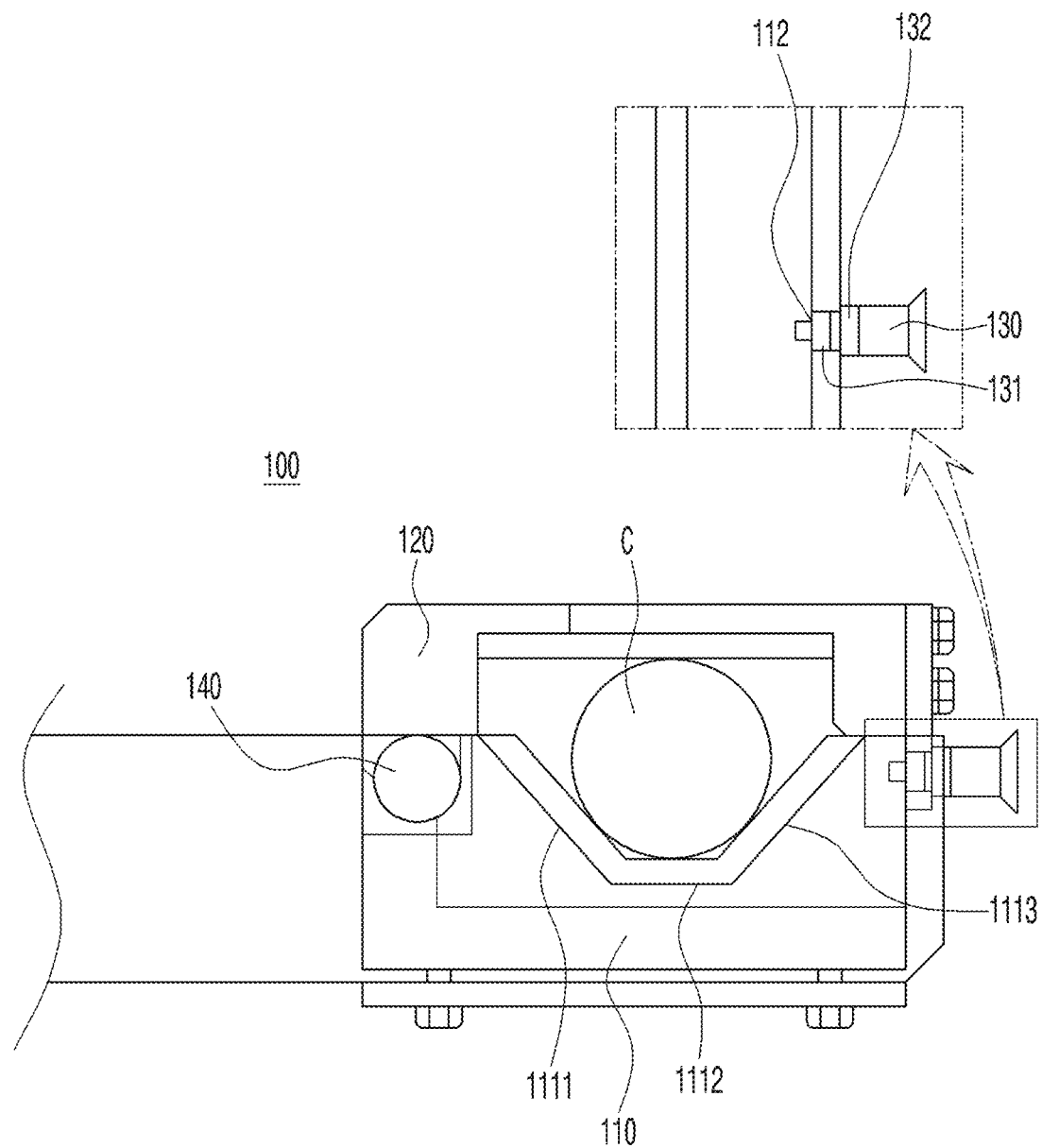
FIG. 2 is a schematic elevation view of a lock device for an electrode transfer cart according to one embodiment.
Figure 3:
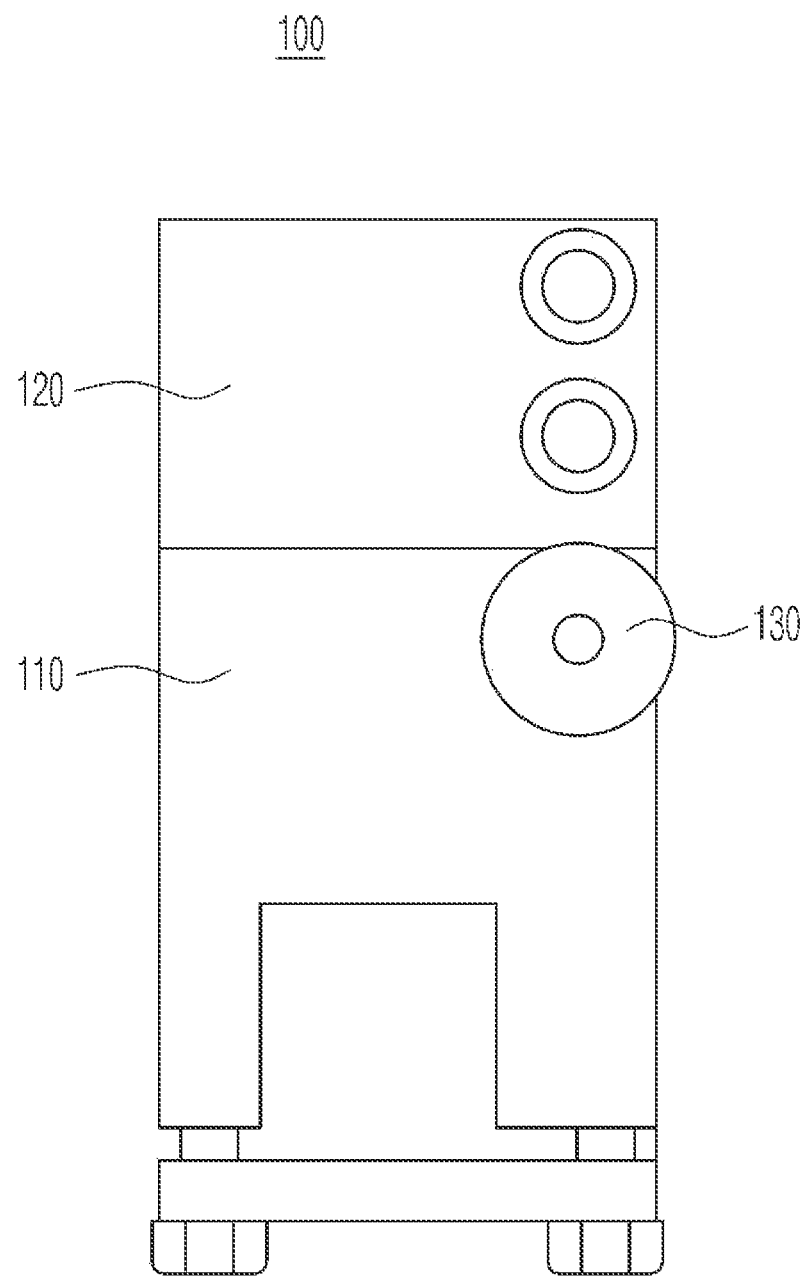
FIG. 3 is a right side view of the lock device for an electrode transfer cart illustrated in FIG. 2.
Figure 4:
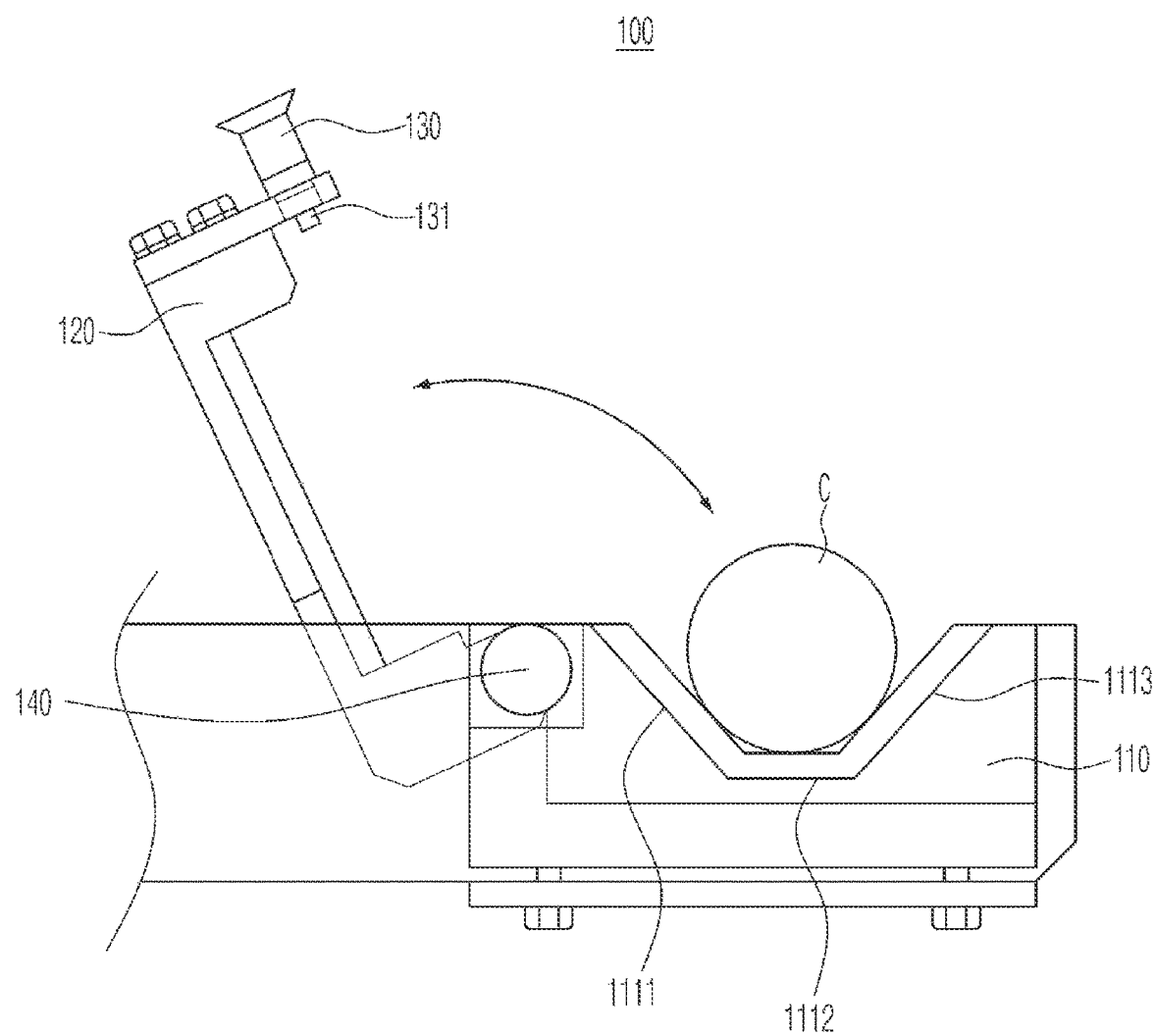
FIG. 4 is a schematic elevation view of an opened form of the lock device for an electrode transfer cart illustrated in FIG. 2.

FIG. 2 is a schematic diagram showing a lock device for an electrode transfer cart according to one embodiment, FIG. 3 is a right side view of a lock device for an electrode transfer cart illustrated in FIG. 2, and FIG. 4 is a schematic diagram showing an opened form of a lock device for an electrode transfer cart according to one embodiment.

Referring to FIGS. 2 to 4, a lock device 100 for an electrode transfer cart includes a lower block 110, an upper block 120 and a lock handle 130. More specifically, a lock device 100 for an electrode transfer cart includes: a lower block 110 having a mounting groove 111 on which a central axis C of a jumbo roll is mounted; an upper block 120 having a structure which covers the open surface of the lower block 110, in a state that the central axis of the jumbo roll has been mounted, and one side of the upper block 120 is fixed to the lower block 110 by a hinge 140; and a lock handle 130 which is formed at an opposite side of the hinge 140-fixed side of the upper block 120 and includes a fixing pin 131 which switches between a lock state and an open state by being inserted into or detached from a lock groove 112 formed at a position corresponding to the lower block 110.

Particularly, according to the lock device 100 for an electrode transfer cart, after mounting the central axis C of the jumbo roll on the lower block 110, the upper portion of the lower block 110 was covered with the upper block 120, and the fixing pin 131 was inserted into the lock groove by using the lock handle 130. In this way, the lock device 100 can be firmly fixed.

Further, the jumbo roll has a structure where a metal foil used for formation of an electrode current collector, or an electrode substrate, in which an electrode mixture layer has been coated on a current collector, is wound. Further, the central axis C of the jumbo roll refers to a bobbin for winding the metal foil or electrode substrate.

The mounting groove 111 of the lower block 110 has a groove structure formed by consecutive connection of a first downward slope 1111, a horizontal plane 1112, and second upward slope 1113 in a direction from one side to another side. The first downward slope 1111, the horizontal plane 1112 and the second upward slope 1113 are used to more easily dispose the central axis C of the jumbo roll. It is illustrated in the drawings that the lower block 110 is a U-shaped lower block including two slopes and one flat surface, but the present invention is not limited to this example.

The lower inner surface of the upper block 120 has a horizontal plane structure. The lower inner surface of the upper block 120 is a surface contacting the central axis C of the jumbo roll and can prevent detachment of the jumbo roll from the lower block 110 by pressing the central axis C of the jumbo roll disposed on the lower block 110. Particularly, the wobble of the front surface, rear surface, upper surface and lower surface of the central axis C of the jumbo roll may be prevented during the transfer of the jumbo roll by the structure of the lower block 110 and the upper block 120, and the detachment, etc. of the jumbo roll may be prevented.

The lower block 110 and the upper block 120 are fixed to each other by the hinge 140. Specifically, the hinge 140 may be installed in a region connected to the mounting arm of the transfer cart, and the lock device 100 can be opened and closed by moving the upper block 120 based on the axis of the hinge 140. Specifically, the position of a hinge 140, which fastens a lower block 110 to an upper block 120, may be changed in at least one direction among a vertical direction, a horizontal direction, and a diagonal direction by spiral rotation.

Further, when the fixing pin 131 is inserted into the locking groove 112 and is pressed by an elastic body 132, the lock handle 130 is in a locked state. When the fixing pin 131 is pulled out the locking groove 112 by pulling the fixing pin 131 in the opposite direction to the pressing direction of the elastic body 132, the locking handle 130 is in an open state. Particularly, the upper block 120 and the lower block 110 can be firmly fixed by inserting the fixing pin 131, which is connected to the upper block 120, to the lock groove 112 of the lower block 110.

The lock handle 130 can easily fix the upper block 120 and the lower block 110 in one touch manner, and an open state of the upper block 120 from the lower block 110 can be formed in one touch manner.

Second Embodiment

Figure 5:
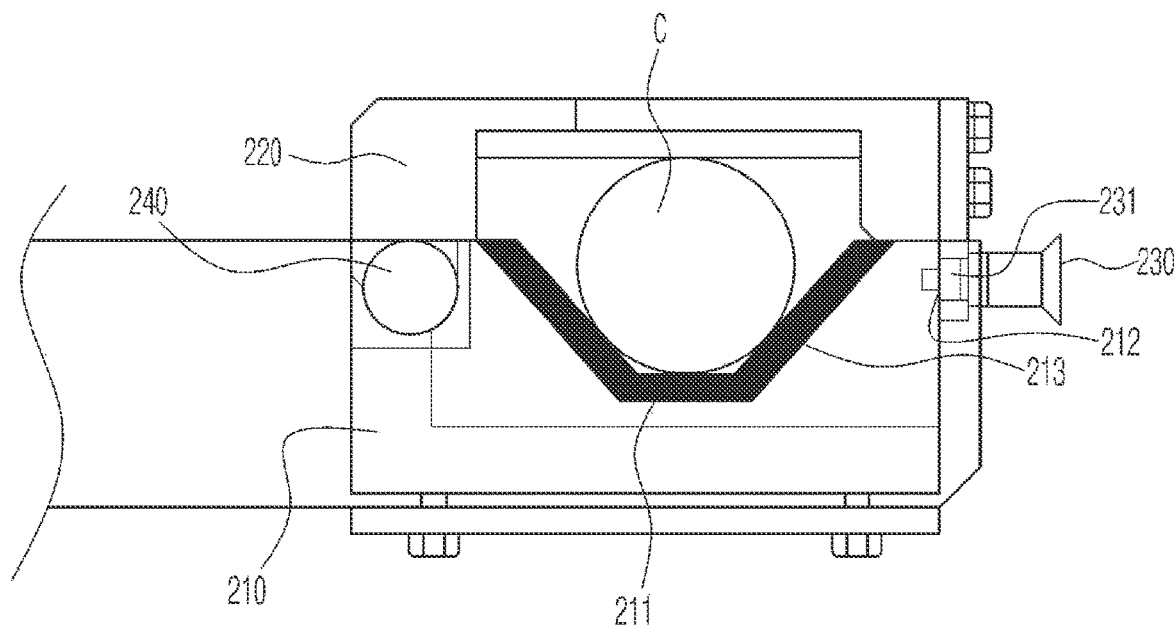
FIG. 5 is a schematic elevation view of a lock device for an electrode transfer cart according to another embodiment.

FIG. 5 is a schematic diagram showing a lock device for an electrode transfer cart according to another embodiment. Referring to FIG. 5, a lock device 200 for an electrode transfer cart includes: a lower block 210 having a mounting groove 211 on which a central axis C of a jumbo roll is mounted; an upper block 220 having a structure which covers the open surface of the lower block 210, in a state that the central axis of the jumbo roll has been mounted, and one side of the upper block 220 is fixed to the lower block 210 by a hinge 240; and a lock handle 230 which is formed at an opposite side of the hinge 240-fixed side the upper block 220 and includes a fixing pin 231 which switches between a lock state and an open state by being inserted into or detached from a lock groove 212 formed at a position corresponding to the lower block 210. At this time, an anti-slip pad 213 is included in the inner surface of the mounting groove 211 of the lower block 210. Specifically, the anti-slip pad 213 is a nylon pad. More specifically, the anti-slip pad 213 is made of MC nylon, and since the molecular weight and the crystallinity the MC nylon are higher than general nylon6, the self-lubricity, wear resistance, chemical resistance, corrosion resistance, etc. are excellent.

Detachment of the jumbo roll mounted on the lower block can be prevented by including the above-described anti-slip pad in the lower block. Since each component has been described above, the detailed description of each component will be omitted here.

Third Embodiment

Figure 6:
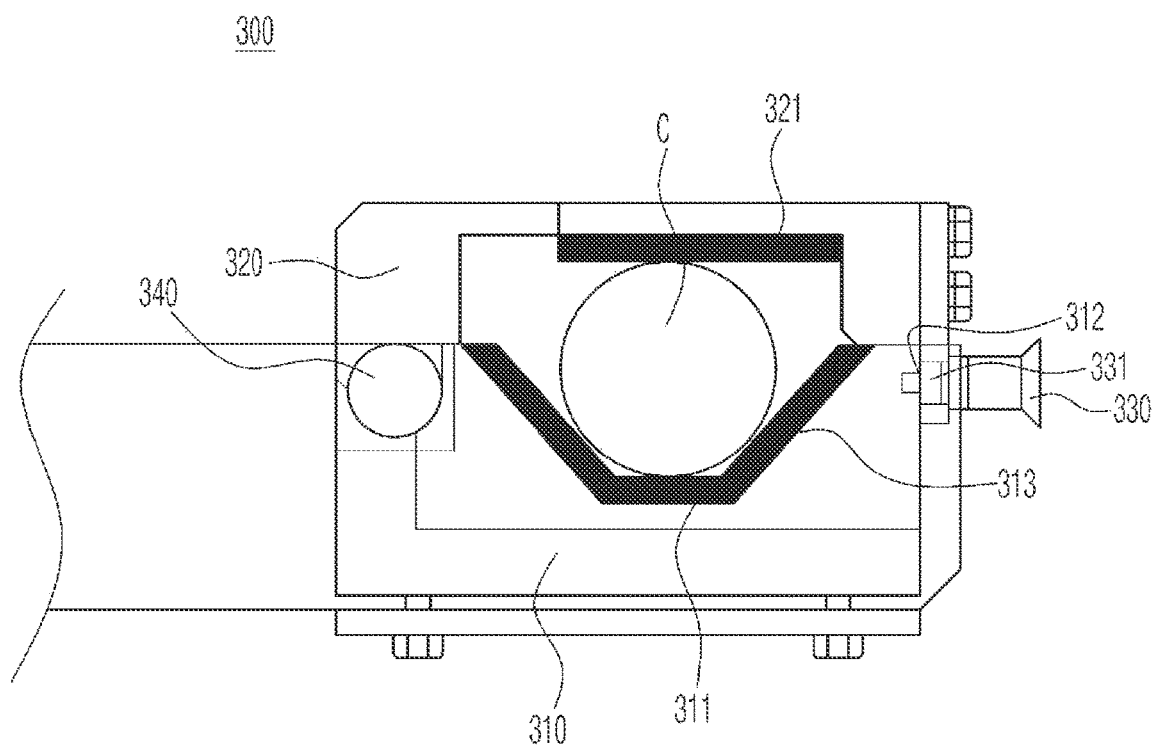
FIG. 6 is a schematic elevation view of a lock device for an electrode transfer cart according to yet another embodiment.

FIG. 6 is a schematic diagram showing a lock device for an electrode transfer cart according to yet another embodiment. Referring to FIG. 6, a lock device 300 for an electrode transfer cart includes: a lower block 310 having a mounting groove 311 on which a central axis C of a jumbo roll is mounted; an upper block 320 covering the open surface of the lower block 310, in a state that the central axis of the jumbo roll has been mounted, and the one side of the upper block 320 is fixed to the lower block 310 by a hinge 340; and a lock handle 330 which is formed at an opposite side of the hinge 340-fixed side of the upper block 320 and includes a fixing pin 331 which switches between a lock state and an open state by being inserted into or detached from a lock groove 312 formed at a position corresponding to the lower block 310.

At this time, a buffer pad 321 is included in the lower inner surface of the upper block 320. Specifically, the buffer pad 321 is a urethane pad. Specifically, the urethane pad is made of flexible synthetic fiber which is resistant to moisture, acid and base and is waterproof. Particularly, by including a urethane pad on the lower inner surface of the upper block 320, when the transfer cart is moved, the urethane pad adsorbs the central axis C of the jumbo roll to thereby remove vibration.

Further, an anti-slip pad 313 is included in the inner surface of the mounting groove 311 of the lower block 310. Specifically, the anti-slip pad 313 is a nylon pad. Since each component has been described above, the detailed description of each component will be omitted here.

Fourth Embodiment

Figure 7:
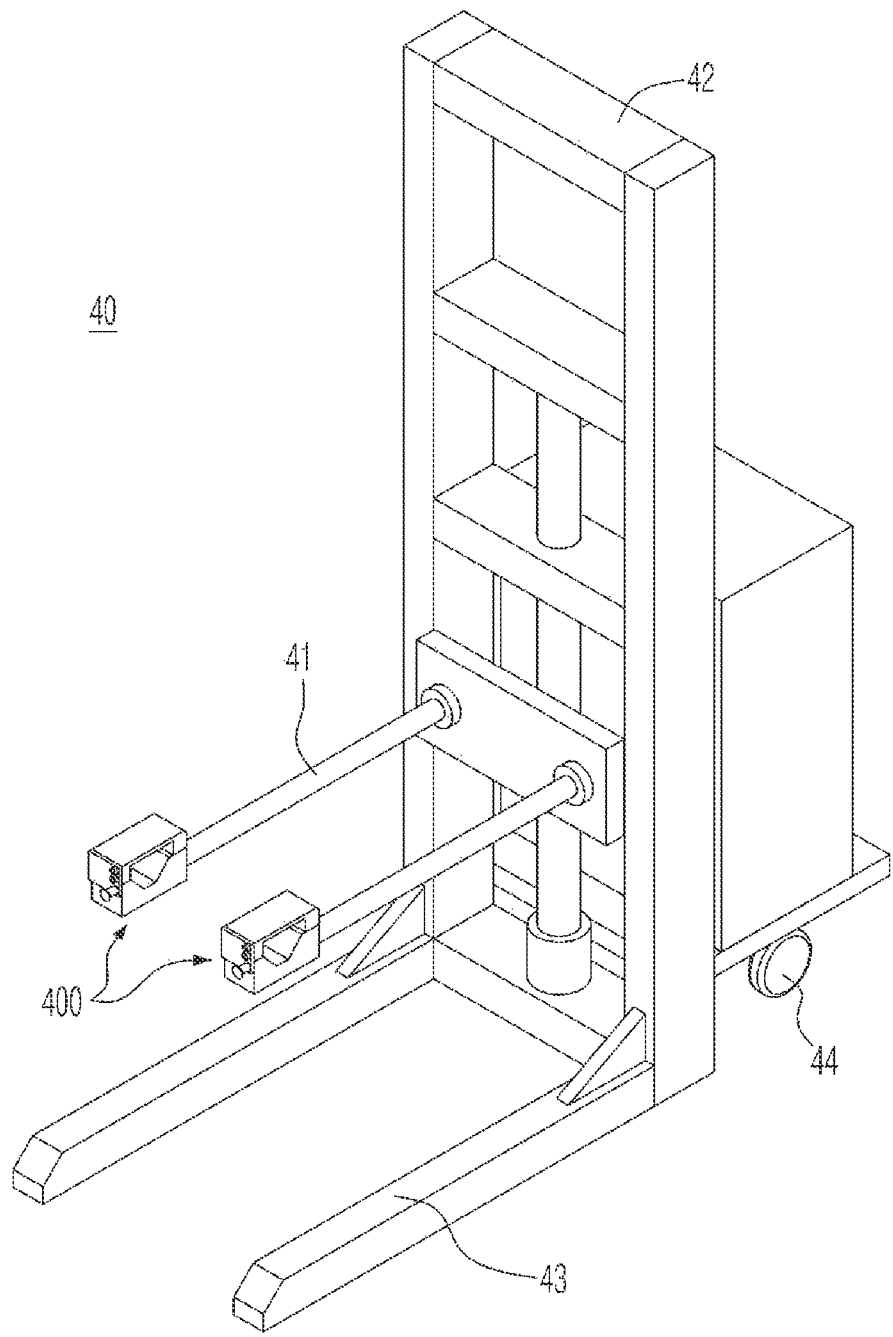
FIG. 7 is a schematic perspective view of an electrode transfer cart according to yet another embodiment.
Figure 8:
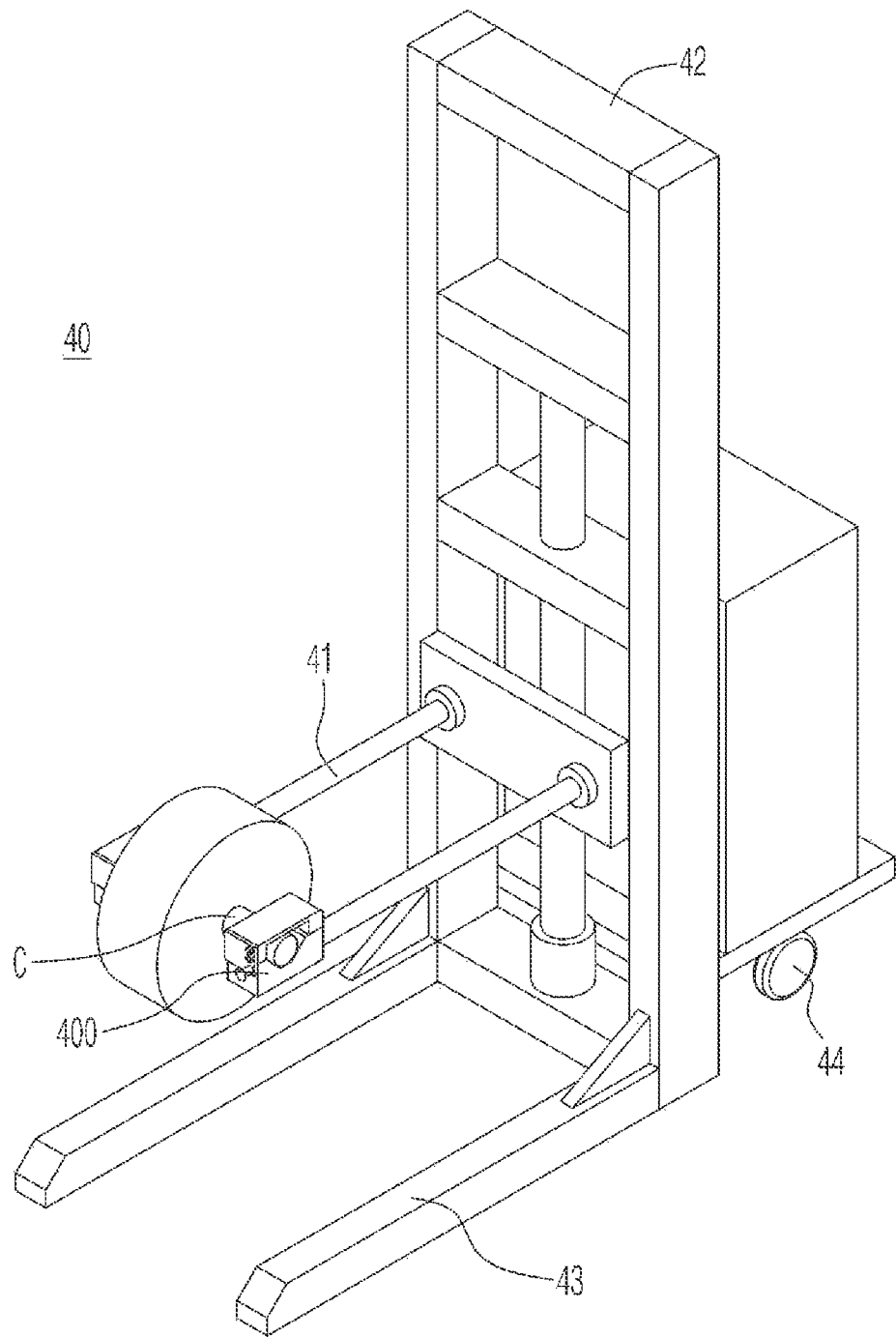
FIG. 8 is a schematic perspective view of the electrode transfer cart of FIG. 7 in a state in which a jumbo roll has been mounted on the electrode transfer cart according to yet another embodiment.

FIG. 7 is a schematic diagram showing an electrode transfer cart according to one embodiment, and FIG. 8 is a schematic diagram showing a state that a jumbo roll has been mounted on an electrode transfer cart according to one embodiment.

Referring to FIGS. 7 and 8, the electrode transfer cart 40 includes a lock device 400. Specifically, the electrode transfer cart 40 further includes a protruding mounting arm 41 for mounting a jumbo roll, and the lock device 400 is fastened to the mounting arm 41. Further, a pair of mounting arms 41 are provided to hold two sides of the jumbo roll. Further, the central axis C of the jumbo roll is mounted on the lock device 400 fastened to each of the pair of mounting arms 41.

The electrode transfer cart 40 includes a handle 42. The handle 42 is formed at a side opposite to the direction in which the mounting arms 41 protrude. Further, the electrode transfer cart 40 may include a support 43 which protrudes in the same direction as the direction in which the mounting arm has protruded. The support 43 supports the electrode transfer cart 40 to be erected when the electrode transfer cart 40 does not move. Further, the electrode transfer cart 40 has a lever structure in which wheels 44 are rotated around the rotation shaft. If the handle of the electrode transfer cart 40 is turned downwards, the mounting arm is tilted to the front side based on the wheel axis of the wheel 44. Further, the user may easily transfer a jumbo roll with less force.

In some examples of the present invention, a metal foil used for formation of an electrode current collector is wound on a jumbo roll which is a subject of transfer. Alternatively, an electrode substrate, where an electrode mixture layer has been coated on the electrode current collector, is wound on the jumbo roll which is a subject of transfer. However, the present invention is not limited thereto. Since each component has been described above, the detailed description of each component will be omitted here.

Further, since the electrode transfer cart according to some examples of the present invention includes a lock device, detachment of the jumbo roll can be prevented.

Although preferred examples of the present invention have been described with reference to drawings, it can be understood that those skilled in the art can make various modifications and changes to the present invention without departing from the spirit and scope of the invention as set forth in the claims below.

Therefore, the technical scope of the present invention should not be limited to the contents described in the detailed description of the specification but should be defined by the claims.

DESCRIPTION OF REFERENCE NUMERALS 10, 40: electrode transfer cart
11, 41: mounting arm
42: handle
43: support
100, 200, 300, 400: lock device for electrode transfer cart
110, 210, 310: lower block
111, 211, 311: mounting groove
1111: first downward slope
1112: horizontal plane
1113: second upward slope
112, 212, 312: lock groove
213, 313: anti-slip pad
120, 220, 320: upper block
321: buffer pad
130, 230, 330: lock handle
131, 231, 331: fixing pin
140, 240, 340: hinge
C: central axis of jumbo roll

The invention claimed is:

1. A lock device for an electrode transfer cart, the lock device comprising:
a lower block having a mounting groove configured for mounting a central axis of a jumbo roll in the mounting groove, the lower block including an open surface opened in one direction, the lower block being a U-shaped lower block and the mounting groove being opened in an upward direction;
a hinge;
an upper block covering the open surface of the lower block, when the central axis of the jumbo roll has been mounted, and having one side fixed to the lower block by the hinge, the upper block being configured to cover an upper portion of the U-shaped lower block when the central axis of the jumbo roll is mounted in the mounting groove and the one side of the upper block is fixed to the lower block by the hinge; and
a lock handle formed at an opposite side of the hinge-fixed side of the upper block and including a fixing pin which switches between a lock state and an open state by being inserted into or detached from a lock groove formed at a position corresponding to the lower block,
wherein the mounting groove of the lower block is formed by consecutive connection of a first downward slope, a horizontal plane, and second upward slope in a direction from one side to another side, and
wherein the lock device is configured such that when the central axis of the jumbo roll is mounted in the mounting groove, the central axis of the jumbo roll is in contact with the first downward slope, the horizontal plane, and the second upward slope.

2. The lock device of claim 1, further comprising an anti-slip pad positioned on an inner surface of the mounting groove of the lower block.

3. The lock device of claim 1, wherein a lower inner surface of the upper block defines a horizontal plane.

4. The lock device of claim 1, further comprising a buffer pad positioned on a lower inner surface of the upper block.

5. The lock device of claim 1, wherein when the fixing pin is inserted into a locking groove and is pressed by an elastic body, the lock handle is in a locked state, and wherein when the fixing pin is out of the locking groove, the lock handle is in an open state.

6. The lock device of claim 5, wherein the fixing pin is removable from the locking groove by pulling the fixing pin in an opposite direction to a pressing direction of the elastic body.

7. The lock device of claim 1, wherein the hinge is configured to change a position of the upper block by rotation thereof relative to the lower block.

8. The lock device of claim 1, wherein a diameter of the central axis of the jumbo roll is in a range of 5 to 10 inches.

9. An electrode transfer cart comprising the lock device according to claim 1.

10. The electrode transfer cart of claim 9, further comprising a protruding mounting arm configured for mounting the jumbo roll, wherein the lock device is fastened to the mounting arm.

11. The electrode transfer cart of claim 9, further comprising:

the jumbo roll; and a metal foil used for formation of an electrode current collector wound on the jumbo roll.

12. The electrode transfer cart of claim 9, further comprising:

the jumbo roll; and an electrode substrate wound on the jumbo roll, the electrode substrate including an electrode current collector and an electrode mixture layer coated on the electrode current collector.

* * * * *